United States Patent [19]

Hiromoto et al.

[11] Patent Number: 5,418,289

[45] Date of Patent: May 23, 1995

[54] PROCESS FOR PRODUCING A THERMOPLASTIC RESIN COMPOSITION AND A GRAFT COPOLYMER

[75] Inventors: Yasuyuki Hiromoto; Koichi Matsuda; Hideo Goto, all of Yamaguchi, Japan

[73] Assignee: Ube Cycon Ltd., Tokyo, Japan

[21] Appl. No.: 68,304

[22] Filed: May 28, 1993

Related U.S. Application Data

[63] Continuation-in-part of Ser. No. 680,254, Apr. 4, 1991, abandoned.

[51] Int. Cl.6 .................. C08L 39/00; C08L 39/04
[52] U.S. Cl. .................................................... 525/73
[58] Field of Search ........................................ 525/73

[56] References Cited

U.S. PATENT DOCUMENTS 4,877,833  10/1989  Kondo et al. .................. 525/73

FOREIGN PATENT DOCUMENTS

| | | |
|---|---|---|
| 46-34103 | 10/1971 | Japan . |
| 47-6891 | 4/1972 | Japan . |
| 57-100104 | 6/1982 | Japan . |
| 58-101141 | 6/1983 | Japan . |
| 58-185642 | 10/1983 | Japan . |
| 59-11322 | 1/1984 | Japan . |
| 60-155216 | 8/1985 | Japan . |
| 63-275414 | 5/1990 | Japan . |

*Primary Examiner*—John Kight, III
*Assistant Examiner*—Jeffrey Mullis
*Attorney, Agent, or Firm*—Kanesaka & Takeuchi

[57] ABSTRACT

A thermoplastic resin composition comprising 10 to 60 parts by weight off a maleimide series graft copolymer (A) and 90 to 40 parts by weight of a hard polymer (B) described below:

(A) a maleimide series graft series copolymer obtained by emulsion graft copolymerization of a specific monomer mixture to a crosslinked latex containing an ethylene-propylene-non-conjugated diene copolymer and (B) a hard polymer containing a mixture of specific monomers.

A process for producing a maleimide series graft copolymer, in which a monomer mixture and a redox type initiator are added to the polymerization system for more than one hour and the pH value of the aqueous polymerization phase is kept at 10.0–7.0.

15 Claims, No Drawings

PROCESS FOR PRODUCING A THERMOPLASTIC RESIN COMPOSITION AND A GRAFT COPOLYMER

This application is a continuation-in-part of application Ser. No. 680,254, filed Apr. 4, 1991, now abandoned.

FIELD OF THE INVENTION AND RELATED ART STATEMENT

The present invention concerns a process for producing a thermoplastic resin composition and a graft copolymer and, more in particular, it relates to a process for producing a thermoplastic resin composition comprising a specific graft copolymer and a specific hard copolymer blended together and excellent in impact resistance, heat resistance, rigidity, weather proofness and drop-weight impact strength and a process for producing a graft copolymer capable of obtaining a graft copolymer of excellent characteristics suitable as a constituent of the thermoplastic resin composition stably and at a high yield.

Styrene series resins such as ABS (acrylonitrile-styrene-butadiene copolymer) resins have high impact strength, satisfactory dimensional accuracy and excellent moldability and, accordingly, they have been used generally as molding materials. However, they involve a problem that they are poor in the heat resistance and the like. In view of the above, various studies have hitherto been made for improving the heat resistance of styrene series resins such as ABS resins and further improving the impact shock resistance.

For instance, it has been reported that a maleimide series graft polymer obtained by graft copolymerizing, a maleimide compound, an aromatic vinylic monomer or the like to a conjugated diene series rubbery polymer is effective for the improvement of the heat resistance and the impact resistance (Japanese Patent Publication Sho 46-34103 and Japanese Patent Laid-Open Sho 47-6891).

There have been also reported for a process for producing a maleimide series graft copolymer by imidizing a graft copolymer obtained by grafting maleic acid anhydride and other vinylic monomer to a rubbery polymer, by using ammonia or primary amine (Japanese Patent Laid-Open Sho 57-100104 and Sho 60-155216), and that compositions prepared by blending the rubber-modified maleimide series graft copolymer obtained by the above-mentioned process with a copolymer such as styrene-acrylonitrile (Japanese Patent Laid-Open sho 58-185642 and Sho 58-101141) have excellent heat resistance and impact resistance.

There has further been proposed a method of conducting polymerization while controlling the rate of supplying the maleimide series monomer to the polymer system within a specific range under the presence of a rubbery polymer thereby homogenously controlling the copolymer composition, with an aim of improving the impact resistance (Japanese Patent Laid-Open Sho 59-113122).

In the prior art described above, the process of copolymerizing, the maleimide series compound, the aromatic vinyl monomer or the like with the conjugated diene series rubbery polymer involves a drawback that homogenous graft polymerization to the rubbery polymer is difficult and that the heat resistance and the impact resistance of the resin composition using the thus obtained maleimide series graft copolymer are not yet sufficient.

Further, the method of imidizing a graft copolymer prepared by grafting maleic acid anhydride and other vinyl type monomer to the rubbery polymer, by using ammonia or primary amine has a drawback that the polymerization step is complicate and requires a high temperature reaction. In addition, since there is an actual limit to polymerization conditions, etc., it is extremely difficult to produce a high rubber maleimide series graft copolymer with the rubber content of not less than 40% by weight. Accordingly, no sufficient characteristics can be obtained in the composition blended with the rubber modified maleimide series graft copolymer produced by the method.

In addition, the method of conducting polymerization while controlling the rate or supplying the maleimide series monomer to the polymer system to a specific range requires a longer period of time till completion of the polymerization, which is industrially disadvantageous,

OBJECT AND SUMMARY OF THE INVENTION

An object of the present invention is to overcome the foregoing problems in the prior art and to provide a thermoplastic resin composition having excellent impact resistance, heat resistance and rigidity, and high drop-weight impact strength, and being well-balanced for such properties.

Another object of the present invention is to provide a process for producing a graft copolymer capable of obtaining a maleimide series graft copolymer suitable to the production of the thermoplastic resin composition having such excellent characteristics, by means of emulsion polymerization, at a high polymerization stability and a high yield.

The thermoplastic resin composition according to the present invention comprises 10 to 60 parts by weight of a maleimide series graft copolymer (A) and 90 to 40 parts by weight of a hard copolymer (B) described below:

(A): A maleimide series graft copolymer obtained by emulsion graft polymerization of 60 to 20 parts by weight of a monomer mixture comprising 5 to 30% by weight of a maleimide series monomer, 25 to 80% by weight of an aromatic vinyl series monomer, 5 to 40% by weight of a vinyl cyanide series monomer and 0 to 50% by weight of a monomer capable of copolymerization with the above-mentioned monomers, with 40 to 80 parts by weight (as the solid content) of a crosslinked latex comprising ethylene-propylene-no-conjugated diene copolymer containing 0.1 to 20 parts by weight of an acid modified low molecular weight α-olefin copolymer based on 100 parts by weight of an ethylene-propylene-non-conjugated diene copolymer.

(B): A hard copolymer comprising 5 to 30% by weight of a maleimide series monomer, 25 to 80% by weight of an aromatic vinyl series monomer, 5 to 40% by weight of a vinyl cyanate series monomer and 0 to 50% by weight off a monomer capable of copolymerizable with the above-mentioned monomers.

In an aspect of the present invention for producing a graft copolymer, a graft copolymer is produced by emulsion polymerization of 60 to 20 parts by weight of a monomer mixture comprising 5 to 30% by weight off a maleimide series monomer, 25 to 80% by weight of an aromatic vinyl monomer, 5 to 40% by weight of a vinyl cyanide series monomer and 0 to 50% by weight of a monomer copolymerizable with the above-mentioned monomers, with the presence of 40 to 80 parts by weight (as the solid content) of a crosslinked latex containing ethylene-propylene-non-conjugated diene copolymer containing 0.1 to 20 parts by weight of a modified low molecular weight α-olefin copolymer based on 100 parts by weight of an ethylene-propylene-non-conjugated diene copolymer, by using one or more of emulsifiers, wherein the monomer mixture and a redox initiator are continuously added for more than one hour to the polymerization system, and an aqueous solution of an alkaline is added continuously so as to maintain pH value in the aqueous polymerization phase from 10.0 to 7.0 from the initiation till the completion of polymerization.

The present invention can provide a thermoplastic resin composition of excellent characteristics, having excellent properties such as impact resistance, heat resistance, rigidity, weather proofness and drop-weight impact strength, and being well-balanced for such characteristics.

Further, according to the production process of the graft copolymer of the present invention, a maleimide series copolymer having excellent characteristics suitable to the production of the thermoplastic resin composition of excellent characteristics according to the present invention can be produced under high polymerization stability and a high yield.

DESCRIPTION OF THE PREFERRED EMBODIMENTS

The present inventors have made earnest studies for obtaining a thermoplastic resin composition having excellent weather proofness, impact resistance, heat resistance, rigidity and drop-weight impact strength in good balance and, as a result, have accomplished the first invention based on the finding that a thermoplastic resin composition of excellent characteristics can be obtained by blending a specific maleimide series graft copolymer and a specific hard copolymer at a predetermined ratio.

Further, we have also made the following consideration for obtaining a process for efficiently producing a maleimide series graft copolymer used for such a thermoplastic resin composition of excellent characteristics.

As a process for producing a maleimide series graft copolymer by using a maleimide series monomer, there can be mentioned, for example, solution polymerization, bulk polymerization and suspension polymerization. Among them, emulsion polymerization is advantageous with a view point that steps are simple, homogenity control for the graft ingredients is easy and the rubber content of the maleimide series graft copolymer can be increased.

However, in a case of graft copolymerizing the aromatic vinyl series monomer, vinyl cyanide series monomer and maleimide series monomer by means of emulsion polymerization to the ethylene-propylene-non-conjugated diene copolymer, if all of the monomers are added at once or in an extremely short period of time to the polymerization system and the polymerization is started, stability of a latex is sometimes worsened to make the copolymerization impossible. Then, even if the polymerization is completed and the maleimide series graft copolymer is obtained, the polymerization yield is low. In addition, since the graft ingredients are not homogenous, no satisfactory characteristics can be obtained with the resin composition using such a meleimide series graft copolymer.

As a result of the study on the reasons as described above, we have found that the maleimide series monomer is liable to undergo hydrolysis if the pH value in the aqueous polymerization phase is increased to greater than 9, thereby lowering the pH value in the polymerization system and reducing the surface activity of the emulsifier, to worsen the stability of the latex. In particular, the EPDM (ethylene-propylene-non-conjugated copolymer) latex is instable and is liable to undergo the effect of the pH value. In addition, it has been known that the maleimide series monomer and the aromatic vinyl series monomer have a high polymerizability and they are polymerized to each other preferentially but we have found that the polymerization rate depends greatly on the effect of the pH value in the aqueous polymerization system and, in turn, it gives a significant effect on the composition of the graft ingredients, grafting ratio and molecular weight of grafted chain or the like.

Based on such a finding, we have made further studies, for the emulsion polymerization method of excellent polymerization stability, capable of providing high polymerization yield and capable of improving the characteristics of the resin composition using the resultant maleimide series graft copolymer and, as a result, have accomplished the second invention based on the finding that a maleimide series graft copolymer of excellent characteristics can be obtained at a high polymerization stability and at a high yield by defining the addition time of the monomers and the pH value in the aqueous polymerization system.

The present invention will now be described more in details.

At first, description will be made to a thermoplastic resin composition according to the present invention.

The thermoplastic resin composition according to the present invention contains the maleimide series copolymer (A) and the hard copolymer (B) as described above at a predetermined ratio.

In the ingredient (A) described above, the ethylene-propylene-non-conjugated diene copolymer as the rubbery ingredient (hereinafter referred to simply as "EPDM") is a rubbery copolymer of ethylene and propylene and non-conjugated diene, in which the weight ratio of ethylene to propylene contained is preferably within a range from 85:15 to 30:70. As the non-conjugated diene ingredient, 1,4-hexadiene, 5-ethylidene-2-norbornene, 5-vinynorbornene and dicyclopentadiene are preferred for instance.

As the modified low molecular weight α-olefin copolymer, there can be mentioned, for example, an acid modified polyethylene comprising 99.8 to 80% by weight of α-olefin and 0.2 to 20% by weight of an unsaturated carboxylic acid series compound with molecular weight of 1,000–4,000. For example, they can be mentioned herein, ethylene as the α-olefin, and acrylic acid, maleic acid, iraconic acid, maleic acid anhydride, iraconic acid anhydride and maleic acid monoamide as the unsaturated carboxylic acid series compound.

The "acid modified polyethylene comprising 99.8 to 80% by weight of α-olefin and 0.2 to 20% by weight of an unsaturated carboxylic acid series compound" is actually "High Wax 2203A" which is described in Example 1 in page 20 of the specification and has been manufactured and in sale by Mitsui Petrochemical Co.

The "High Wax 2203A" was therefore known to a person in the art when the application was filed.

The "High Wax 2203A" is prepared by mixing 95 wt parts of polyethylene which is α-olefin and 5 wt parts of maleic anhydride which is unsaturated carboxylic acid, and then fusing them at 180°~200° C. under peroxide. They react according to the following reaction formula.

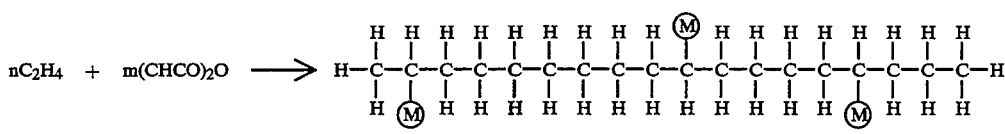

Wherein
"n" is 95,
"m" is 5, and
"M" is carboxil group derived from maleic anhydride.

The "High Wax 2203A" has the following characteristics:

| | |
|---|---|
| viscosity-average molecular weight | 2,700 |
| density | 0.93 g/cm$^3$ |
| acid value | 30 KOH mg/g |
| crystallinity | 65% |
| melting point | 107° C. |
| softening point | 111° C. |
| hardness (penetration) | $3 \times 10^{-1}$ mm |
| melting viscosity | 300 cp |

The "High Wax 2203A" is reactive to alcohols, amines, isocyanates and oligomers having an epoxy group. The "High Wax 2203A" can be emulsified.

The acid modified polyethylene was used in the present invention because hydrophilic groups are introduced more easily by the acid modified polyethylene having polar groups "M" added thereto during acid modification than by ordinary ethylene. The acid modified polyethylene enhances stability of latex.

A person skilled in the art can understand fully that the acid modified polyolefine has the polar group "M" introduced thereto during acid modification.

By blending such a modified low molecular weight α-olefin copolymer by more than 0.1 parts by weight based on 100 parts by weight of the EPDM as described above, it is possible to improve the stability and increase the impact strength of the resultant EPDM-containing crosslinked latex. If the blending amount exceeds 20 parts by weight, the impact strength is remarkably reduced. In view of the above, the EPDM-containing crosslinked latex comprises 0.1 to 20 parts by weight of the modified low molecular weight α-olefin copolymer blended with 100 parts by weight of EPDM in the present invention.

The monomer to be graft polymerized with the EPDM includes a maleimide series monomer, aromatic vinyl series monomer, vinyl cyanide series monomer and, if required, a mixture of such monomers and another monomer copolymerizable therewith. Among the monomers as described above, there can be mentioned as the maleimide series monomer, for example, maleimide, N-methylmaleimide, N-ethylmaleimide, N-butylmaleimide, N-laurylmaleimide, N-phenylmaleimide and N-(p-bromophenyl)maleimide and, as the aromatic vinyl series monomer, there can be mentioned, for example, styrene, α-methylstyrene and p-methylstyrene.

As the vinyl cyanide series monomer, there can be mentioned, for example, acrylonitrile and methacrylonitrile. Further, as the monomer copolymerizable with the above-mentioned monomers, the monomer includes, for example, methacrylate and methylmethacryalte.

In the present invention, the monomer mixture contains 5 to 30% by weight of a maleimide series monomer, 25 to 80% by weight of an aromatic vinyl series monomer, 5 to 40% by weight of a vinyl cyanide series monomer and 0 to 50% by weight of a monomer copolymerizable therewith. In the monomer mixture, the maleimide series monomer has, in particular, an effective effect for the improvement of the balance between the impact strength and the heat resistance of the aimed resin composition. If the maleimide series monomer is not greater than 5% by weight, a resin composition of excellent balance between the impact strength and the heat resistance can not be obtained. The copolymerizable monomer is not always necessary, which may be saved in the present invention.

The maleimide graft copolymer described in (A) above is obtained by emulsion graft polymerization of 60 to 20 parts by weight of the monomer mixture with 40 to 80 parts by weight (as the solid content) of the EPDM-containing crosslinked latex containing 0.1 to 20 parts by weight of the modified low molecular weight α-olefin copolymer relative to 100 parts by weight of the EPDM as described above.

In the maleimide series graft copolymer, if the EPDM-containing crosslinked latex is not greater than 40 parts by weight while the monomer mixture exceeds 60 parts by weight, or if the EPDM-containing crosslinked latex exceeds 80 parts by weight, while the monomer mixture is not greater than 20 parts by weight, the balance between the impact strength and the heat resistance of the aimed resin composition is remarkably worsened.

On the other hand, the hard copolymer described in (B) above contains 5 to 30% by weight of a maleimide series monomer, 25 to 80% by weight of an aromatic vinyl series monomer, 5 to 40% by weight of a vinyl cyanide series monomer and, if required, 0 to 50% by weight of a monomer copolymerizable with the monomers described above. As suitable examples for each of the monomers, those mentioned as the specific examples of the monomers for the monomer mixture used in the maleimide series graft copolymer described in (A) above can be used. It is desirable that the composition ratio is substantially equal to that of the maleimide series graft copolymer described in (A) above. In the hard copolymer (B), the heat resistance of the aimed resin composition is remarkably reduced if the maleimide series monomer is not greater than 5% by weight, while the impact strength is lowered if it exceeds 30% by weight, none of the cases being preferred.

The thermoplastic resin composition according to the present invention contains 10 to 60 parts by weight of the maleimide series graft copolymer described in (A) above and 90 to 40 parts by weight of the hard copolymer described in (B) above and, preferably, the composition containing (A) and (B) is 100 parts by weight in total. If the maleimide graft copolymer is not greater than 10 parts by weight while the hard copolymer exceeds 90 parts by weight, the impact resistance is deteriorated. On the other hand, if the maleimide series graft copolymer exceeds 60 parts by weight while the hard copolymer is not greater than 40 parts by weight, the heat resistance is deteriorated. Accordingly, none of the cases is preferred.

The thermoplastic resin composition according to the present invention can be produced with ease by mixing the maleimide series graft copolymer described in (A) above and the hard copolymer described in (B) above each in a predetermined amount, if necessary, together with an antioxidant, lubricant, processing aid, pigment, filler and other agent and kneading them into pellets by using, for example, an extruder, Banbury mixer or kneading rolls.

The process for producing the graft copolymer according to the present invention is a process suitable to the production of the maleimide series graft copolymer, which is the starting material for the production of the thermoplastic resin composition according to the present invention described above.

Explanation will now be made to the process for producing the graft copolymer according to the present invention.

For producing the maleimide series graft copolymer in accordance with the process of the present invention, it is preferably produced, for example, as shown below.

At first, an EPDM-containing crosslinked latex is prepared by using an EPDM and a modified low molecular weight α-olefin copolymer. That is, the EPDM and the modified low molecular weight α-olefin copolymer are dissolved each in a predetermined amount into an appropriate solvent and then emulsified with addition of an emulsifier. In this case, an aliphatic or cycloaliphatic hydrocarbon solvent such as n-hexane or cyclohexane can be used as the solvent. There is no particular restriction for the emulsifier, but an anionic surface active agent, for example, potassium oleate or disproportionated potassium rosinate can be used. The addition amount of the emulsifier is preferably 1 to 10 parts by weight based on the EPDM. The emulsifier can be added, for example, by mixing oleic acid to a solution of the EPDM and the modified low molecular weight α-olefin, to which an aqueous solution of potassium hydroxide is added, to form potassium oleate. The blending amount of the modified low molecular weight α-olefin is 0.1 to 20 parts by weight based on the EPDM and a stable graft copolymerization can be conducted by adding the modified low molecular weight α-olefin at such a ratio and the physical property of the aimed resin composition can be improved.

After emulsifying the solution of the EPDM and the modified low molecular weight α-olefin with the emulsifier, the emulsion was sufficiently stirred and the solvent is distilled off, to obtain a latex containing particles with a grain size of about 0.2 to 1 μm.

Then, 0.1 to 5.0 parts by weight of a polyfunctional compound such as divinylbenzene and 0.1 to 5.0 parts by weight of an organic peroxide such as di-t-butyl-oxy-trimethylcyclohexane are added to 100 parts by weight of the EPDM in the latex and reacted at 60°–140° C. for about 0.5 to 5.0 hours to prepare a crosslinked latex.

In the present invention, the gel content of the EPDM-containing crosslinked latex prepared in this way is preferably about from 40 to 95% by weight. The gel content of the crosslinked latex can be determined by coagulating the latex with a diluted sulfuric acid, followed by drying, sampling 1 g of specimen, immersing it into 200 ml of toluene for 40 hours, filtering it through a 200 mesh stainings steel gage and drying the residue.

Then, 60 to 20 parts by weight of a monomer mixture comprising 5 to 30% by weight of a maleimide series monomer, 25 to 80% by weight of an aromatic vinyl series monomer, 5 to 40% by weight of a vinyl cyanide series monomer and, if required, 0 to 50% by weight of a monomer copolymerizable with the monomers described above was graft polymerizable under the presence of 40 to 80 parts by weight (as the solid content) of the thus prepared crosslinked latex, by heating to an appropriate polymerization temperature using one or more kind of emulsifiers. The emulsifier used herein is preferably selected from anionic surface active agents such as potassium oleate, disproportionated potassium rosinate, alkali metal alkylbenzene sulfonate, alkali metal alkylnaphtnalene sulfonate and alkali metal lauryl sulfate.

When the graft polymerization is carried out in this way in the present invention, a redox type initiator is mixed in the monomer mixture and continuously added into the polymerization system for more than one hour, while controlling the pH value in the polymerization system by continuously adding an aqueous solution of an alkali from the start to the completion of the polymerization, so as to keep the pH value in the aqueous polymerization phase to 10.0-7.0.

In the present invention, it is necessary to keep the pH of the aqueous polymerization phase at 10.0-7.0 and, in particular, it is preferred to keep pH at 9.0 to 8.0 from 10 min after the start of the polymerization till the completion of the polymerization.

Although the maleimide series monomer is liable to undergo hydrolysis in an aqueous solution at pH of higher than 9.0 as described above, hydrolysis of the maleimide series monomer actually occurs only slightly in the above-mentioned method. In view of the stability of the latex, it is preferred that the pH of the aqueous polymerization phase upon starting polymerization is from 10.0 to 9.0. If the pH value of the aqueous polymerization phase is lower than 7.0, the stability of the latex is extremely worsened.

In the present invention, it is necessary that the redox type initiator is mixed to the monomer mixture, which is added continuously to the polymerization system for more than one hour. If the time of addition is less than 1 hour, the stability of the latex is worsened and the polymerization yield is lowered.

As the redox type initiator used herein, an oil-soluble organic peroxide is preferred and, usually, it is used in a combination with ferrous sulfate-chelating agent-reducing agent. As the oil-soluble initiator, an organic peroxide such as cumene hydroperoxide, diisopropylbenzene hydroperoxide or t-butyl hydroperoxide is preferred. As the chelating agent, sodium pyrophosphate, sodium ethylene-diamine tetraacetate or the like is preferred. As the reducing agent, sodium salt of formaldehyde sulfoxylate, dextrose, sodium ascorbate or the like is preferred.

An antioxidant is added, if required, to the maleimide series graft copolymer latex obtained after completion of the polymerization. Subsequently, resin solids are deposited from the latex of the resultant maleimide series graft copolymer latex. In this case, as the precipitating agent, an aqueous solution, for example, of sulfuric acid, acetic acid, calcium chloride or magnesium sulfate can be used alone or in combination. Further, the maleimide series graft copolymer latex to which the precipitating agent is added is heated and stirred, and then precipitate is separated which are washed with water, dehydrated and dried to obtain a maleimide series graft copolymer.

Description will then be made to a process for producing the hard copolymer described in (B) above to be used in the first invention of the present application.

For the production of the hard copolymer described in (B) above, polymerization such as emulsion polymerization or suspension polymerization is adopted.

When the hard copolymer is synthesized by emulsion polymerization, usual emulsifier for emulsion polymerization such as potassium rosinate or sodium alkylbenzens sulfonate can be used. Further, as the polymerization initiator, organic or inorganic peroxide type initiator is used. As a chain transfer agent, mercaptans, $\alpha$-methylstyrene dimers terpenes etc. are used.

When the hard copolymer is synthesized by suspension polymerization, tricalcium phosphite, polyvinyl alcohol or the like is used as a suspending agent and sodium alkylbenzene sulfonate or the like can be used as a suspension aid. Further, as an initiator, organic peroxides may be used and, as a chain transfer agent, mercaptans, $\alpha$-methylstyrene, terpenes, etc. may be used.

For synthesizing the hard copolymer, constituent monomers are mixed each in a predetermined amount and then polymerized with addition of an appropriate emulsifier, suspending agent, initiator and chain transfer agent. Subsequently, in the case of a hard resin latex obtained by emulsion polymerization, resin solids are precipitated. In this case, as the precipitating agent, an aqueous solution, for example, of sulfuric acid, acetic acid, calcium chloride or magnesium sulfate can be used alone or in combination. If necessary, the precipitates are washed with water, dehydrated and dried, to prepare a hard copolymer.

The present invention will now be described more specifically referring to preparation examples, examples and comparative examples, but the present invention is not limited to the following examples so long as they do not exceed the gist of the present invention. Hereinafter, "parts" means "parts by weight".

Preparation Example 1

Preparation of EPDM-containing crosslinked latex

After dissolving 100 parts of EPDM (EPT3045) manufactured by Mitsui Petrochemical Co. into 566 parts of n-hexane, acid-modified polyethylene (HIGH WAX 2203A) manufactured by Mitsui Petrochemical Co. was added each in an addition amount shown in Table 1, oleic acid was added further and they were dissolved completely. Separately, an aqueous solution containing 0.9 parts of KOH dissolved in 800 parts of water was kept at 60° C., to which the polymer solution prepared as described above was gradually added and emulsified and then stirred by a homomixer. Then, the solvent was distilled off to obtain a latex having particles with a grain size of 0.2 to 1 μm.

To the latex, 1.5 parts of divinyl benzene and 1.0 parts of di-t-butyl peroxytrimethyl cyclohexane based on 100 parts of EPDM as the rubber ingredient were added and reacted at 120° C. for one hour to prepare an EPDM-containing crosslinked latexes No. 1-1 to 1-4.

After coagulating each of the EPDM-containing crosslinked latexes with diluted sulfuric acid, washing with water and then drying, 1 g of specimen was sampled, immersed in 200 ml of toluene for 40 hours, and then filtered through a 200 mesh stainless steel gage and the residue was dried to determine the gel content for each of the latexes. The results as shown in Table 1 were obtained.

TABLE 1

| EPDM-containing latex No. | 1-1 | 1-2 | 1-3 | 1-4 |
|---|---|---|---|---|
| Blend (parts) | | | | |
| EPDM | 100 | 100 | 100 | 100 |
| Acid-modified polyethylene | 0 | 1 | 10 | 25 |
| n-hexane | 566 | 566 | 566 | 566 |
| Oleic acid | 4.5 | 4.5 | 4.5 | 4.5 |
| Water | 800 | 800 | 800 | 800 |
| KOH | 0.9 | 0.9 | 0.9 | 0.9 |
| Gel content (wt %) | 72 | 69 | 73 | 72 |
| Remarks | Comp. Example | Example | Example | Comp. Example |

Preparation Example 2

Preparation of graft copolymer

Starting materials were charged with formulations shown by each of Nos. 2-1 to 2-16 in Table 2 into a stainless steel polymerization vessel equipped with a stirrer and polymerization was conducted. The polymerization temperature was set at a constant temperature of 80° C.

The addition time for the ingredient (II) was 150 min and the addition time for the ingredient (III) was 180 min. However, for No. 2-13, the addition time of the ingredient (II) was 30 min and the addition time for the ingredient (III) was 60 min. The pH value for the aqueous polymerization phase was set as shown in Table 2.

After polymerization, an antioxidant was added and solid contents were precipitated with sulfuric acid and, by way of steps of washing, dewatering and drying, powders of maleimide series graft copolymers 2-1 to 2-5, 2-8 to 2-15, as well as a graft copolymer 2-16 with no maleimide were obtained.

The polymer conversion rate in the preparation for each of the graft copolymers Nos. 2-1 to 2-5 and Nos. 2-7 to 2-16 is shown in Table 2. The monomer conversion ratio was calculated based on the residual amount of the monomer determined by sampling a portion of the latex and using gas chromatography.

As apparent from Table 2, No. 2-6 at a pH value of the aqueous polymerization phase of lower than 7.0 was solidified 95 min after the start of the polymerization, while No. 2-7 at a pH value of the aqueous polymerization phase of greater than 10.0 showed a low monomer conversion. Further Nos. 2-13 prepared by adding a mixture of the monomer and the initiator into the polymerization system within one hour also showed low monomer conversion.

TABLE 2

| No. | 2-1 | 2-2 | 2-3 | 2-4 | 2-5 | 2-6 | 2-7 | 2-8 | 2-9 | 2-10 | 2-11 | 2-12 | 2-13 | 2-14 | 2-15 | 2-16 |
|---|---|---|---|---|---|---|---|---|---|---|---|---|---|---|---|---|
| Ingredient (I) (part) | | | | | | | | | | | | | | | | |
| EPDM latex No. (as solid content) | | | | | | | | | | | | | | | | |
| 1-1 | 70 | | | | | | | | | | | | | | | |
| 1-2 | | 70 | | | | | | | | | | | | | | |
| 1-3 | | | 70 | | | | | | | | | | | | | |
| 1-4 | | | | 70 | 70 | 70 | 70 | 70 | 70 | 70 | 70 | 70 | 70 | 30 | 90 | 70 |
| Water (containing water in latex) | 170 | 170 | 170 | 170 | 170 | 170 | 170 | 170 | 170 | 170 | 170 | 170 | 170 | 170 | 170 | 170 |
| Sodium lauryl sulfate | 1.0 | 1.0 | 1.0 | 1.0 | — | 1.0 | 1.0 | 1.0 | 1.0 | 1.0 | 1.0 | 1.0 | 1.0 | 1.0 | 1.0 | — |
| Sodium hydroxide | 0.01 | 0.01 | 0.01 | 0.01 | 0.01 | 0.01 | 0.01 | 0.01 | 0.01 | 0.01 | 0.01 | 0.01 | 0.01 | 0.01 | 0.01 | 0.45 |
| Sodium pyrophosphate | 0.45 | 0.45 | 0.45 | 0.45 | 0.45 | 0.45 | 0.45 | 0.45 | 0.45 | 0.45 | 0.45 | 0.45 | 0.45 | 0.45 | 0.45 | 0.01 |
| Ferrous sulfate | 0.01 | 0.01 | 0.01 | 0.01 | 0.01 | 0.01 | 0.01 | 0.01 | 0.01 | 0.01 | 0.01 | 0.01 | 0.01 | 0.01 | 0.01 | 0.57 |
| Dextrose | 0.57 | 0.57 | 0.57 | 0.57 | 0.57 | 0.57 | 0.57 | 0.57 | 0.57 | 0.57 | 0.57 | 0.57 | 0.57 | 0.57 | 0.57 | |
| Ingredient (II) (part) | | | | | | | | | | | | | | | | |
| Acrylonitrile | 8 | 8 | 8 | 8 | 8 | 8 | 8 | 8 | 8 | 7 | 7.5 | 9 | 8 | 18.7 | 2.7 | 9 |
| Styrene | 7 | 7 | 7 | 7 | 7 | 7 | 7 | 6 | 6 | — | 13 | 16 | 7 | 16.3 | 2.3 | 21 |
| α-methylstyrene | 11 | 11 | 11 | 11 | 11 | 11 | 11 | 14 | 10 | 20 | — | — | 11 | 25.6 | 3.7 | — |
| N-phenylmaleimide | 4 | 4 | 4 | 4 | 4 | 4 | 4 | 2 | 6 | 3 | 7.5 | 5 | 4 | 9.4 | 1.3 | — |
| Methylmethacrylate | — | — | — | — | — | — | — | — | — | — | 2 | — | — | — | — | — |
| CHP | 1.0 | 1.0 | 1.0 | 1.0 | 1.0 | 1.0 | 1.0 | 1.0 | 1.0 | 1.0 | 1.0 | 1.0 | 1.0 | 2.3 | 0.3 | 1.0 |
| Ingredient (III) (part) | | | | | | | | | | | | | | | | |
| Sodium pyrophosphate | 0.45 | 0.45 | 0.45 | 0.45 | 0.45 | 0.45 | 0.45 | 0.45 | 0.45 | 0.45 | 0.45 | 0.45 | 0.45 | 1.0 | 0.15 | 0.45 |
| Ferrous sulfate | 0.01 | 0.01 | 0.01 | 0.01 | 0.01 | 0.01 | 0.01 | 0.01 | 0.01 | 0.01 | 0.01 | 0.01 | 0.01 | 0.023 | 0.003 | 0.01 |
| Dextrose | 0.56 | 0.56 | 0.56 | 0.56 | 0.56 | 0.56 | 0.56 | 0.56 | 0.56 | 0.56 | 0.56 | 0.56 | 0.56 | 1.3 | 0.19 | 0.56 |
| Potassium oleate | — | — | — | — | 2.0 | — | — | — | — | — | — | — | — | — | — | 1.0 |
| Sodium lauryl sulfate | 1.0 | 1.0 | 1.0 | 1.0 | — | 1.0 | 1.0 | 1.0 | 1.0 | 1.0 | 1.0 | 1.0 | 1.0 | 1.0 | 1.0 | — |
| Sodium hydroxide | 0.6 | 0.6 | 0.6 | 0.6 | 1.0 | 0.2 | 2.2 | 0.3 | 1.0 | 0.5 | 1.0 | 0.8 | 0.6 | 1.8 | 0.1 | — |
| Water | 50 | 50 | 50 | 50 | 50 | 50 | 50 | 50 | 50 | 50 | 50 | 50 | 50 | 50 | 50 | 30 |
| Aqueous polymerization phase pH | | | | | | | | | | | | | | | | |
| (start) | 9.1 | 9.1 | 9.2 | 9.0 | 9.5 | 9.2 | 9.2 | 9.2 | 9.2 | 9.2 | 9.2 | 9.2 | 9.2 | 9.2 | 9.2 | 10.6 |
| (end) | 7.6 | 7.8 | 7.7 | 7.6 | 8.6 | 6.8 *1 | 10.8 | 7.7 | 7.8 | 7.6 | 7.8 | 7.5 | 7.2 | 8.0 | 7.6 | 9.8 |
| Reaction temperature (°C.) | 80 | 80 | 80 | 80 | 80 | 80 | 80 | 80 | 80 | 80 | 80 | 80 | 80 | 80 | 80 | 80 |
| Monomer conversion (%) | 90 | 98 | 97 | 97 | 93 | *2 | 86 | 97 | 97 | 96 | 97 | 96 | 85 | 94 | 95 | 93 |
| Remarks | Comp. Ex | Example | Example | Comp. Ex | Example | Comparative Ex | Comparative Ex | Example | Example | Example | Example | Example | Example | Comparative Example | Comparative Example | Comparative Example |

*1: pH after 95 min.
*2: coagulated after 95 min.

Preparation Example 3

Preparation of hard copolymer

After sufficiently replacing the inside of an autoclave having a stirrer with nitrogen, a monomer, distilled water, a surface active agent, a suspension stabilizer and an organic peroxide were charged each in a predetermined amount as shown in Table 3, the internal temperature was elevated to 80° C. while stirring at a rate of 350 rpm and polymerization was conducted at that temperature for 9 hours. Then, the internal temperature was elevated to 120° C. For 2.5 hours and reaction was conducted at that temperature for 2 hours. The resultant slurry was washed and dried to obtain hard copolymers Nos. 3-1 to 3-6.

TABLE 3

| Hard copolymer No. | 3-1 | 3-2 | 3-3 | 3-4 | 3-5 | 3-6 |
|---|---|---|---|---|---|---|
| Blend (part) | | | | | | |
| Water | 120 | 120 | 120 | 120 | 120 | 120 |
| ABSNa 1) | 0.003 | 0.003 | 0.003 | 0.003 | 0.003 | 0.003 |
| Acrylonitrile | 27 | 27 | 27 | 23 | 30 | 27 |
| Styrene | 23 | 20 | 20 | — | 70 | 10 |
| α-methylstyrene | 37 | 47 | 33 | 67 | — | 23 |
| N-PMI 2) | 13 | 6 | 20 | 10 | — | 40 |
| BPO 3) | 0.7 | 0.7 | 0.7 | 0.7 | 0.7 | 0.7 |
| TBP 4) | 0.07 | 0.07 | 0.07 | 0.07 | 0.07 | 0.07 |
| TCP 5) | 0.6 | 0.6 | 0.6 | 0.6 | 0.6 | 0.6 |
| TDM 6) | 0.1 | 0.1 | 0.1 | 0.1 | 0.18 | 0.1 |
| Monomer conversion (%) | 96 | 97 | 97 | 95 | 98 | 97 |
| Remarks | | Example | | | Comparative Example | |

1) Sodium alkylbenzene sulfonate
2) N-phenylmaleimide
3) Benzoyl peroxide
4) t-butyl peroxybenzoate
5) calcium phosphate
6) t-dodecyl mercaptane

EXAMPLES 1–8
Comparative Examples 1–8

The graft copolymer obtained in the Preparation Example 2 and the hard copolymer obtained in the Preparation Example 3 were kneaded together with 0.5 parts by weight of calcium stearate and 1.5 parts by weight or N,N'-ethylenebisstearylamide at each of blending ratios shown in Table 4, in a Banbury mixer and then molded at 260° C. Various properties of the resultant molding products Nos. 4-1 to 4-15 were tested by the conditions and the method as described below.

Izod Impact Value (kg · cm/cm)
  = ASTM (D256) notched Izod,
    measuring temperature: 23° C.
Heat Distortion Temperature (°C.)
  = ASTM (D648-56)
Tensile Strength (kg/cm²)
  = ASTM (D638) 1/8″
    measuring temperature: 23° C.
Drop-Weight Impact Value (kg · cm)
  = Under the condition:
    using Shimazu Hydroshot HTM-1,
    Impact core speed: 5.0 m/sec
    Plough: 1/4″R
    Specimen holder: 1″φ
    Measuring temperature: 23° C.

Further, weather-proofness was examined by the following method for the molding products of Examples 1-8 (Nos. 4-1 to 4-3 and Nos. 4-6 to 4-10). Weather-Proofness For the test specimen, Izod impact value (according to ASTM D 256. at −30° C., without notch) after 200 and 400 hours were measured by using a weatherometer (Sunshine Super Long Life Xenone Weatherometer WEL-6XS-HCH-B, manufactured by Suga Shikenki Co.) at a black panel temperature of 83° C. (without spray), and the weatherproofness was evaluated based on the impact value.

For the comparison, the weather-proofness was examined in the same way also for general-purpose ABS resin (20 wt% of rubber content) (Comparative Example 8).

The results are shown in Table 4.

It is apparent From Table 4 that the thermoplastic resin composition according to the present invention has a good balance for impact resistance, heat resistance, rigidity, weather-proofness, drop weight impact strength and the like and has excellent properties.

TABLE 4

| | Example | | | Comparative Example | |
|---|---|---|---|---|---|
| Exxample | 1 | 2 | 3 | 1 | 2 |
| Resin composition No. | 4-1 | 4-2 | 4-3 | 4-4 | 4-5 |
| Blend (part) | | | | | |
| Graft copolymer No. | | | | | |
| 2-1 | | | | 35 | |
| 2-2 | 35 | | | | |
| 2-3 | | 35 | | | |
| 2-4 | | | | | 35 |
| 2-5 | | | 35 | | |
| Hard Compolymer No. 3-1 | 65 | 65 | 65 | 65 | 65 |
| Property | | | | | |
| Izod impact value (kg · cm/cm) | 43.5 | 45.7 | 40.2 | 23.8 | 16.2 |

TABLE 4-continued

| Heat Distortion Temperature (°C.) | 117.4 | 118.0 | 117.6 | 117.5 | 116.6 |
|---|---|---|---|---|---|
| Tensile strength (kg/cm²) | 412 | 408 | 426 | 386 | 404 |
| Drop-weight impact value (kg · cm) | | | | | |
| Max. | 254 | 287 | 278 | 194 | 132 |
| Break | 342 | 371 | 384 | 255 | 214 |
| Weather-proofness (kg · cm/cm) | | | | | |
| 0 hr after | | 95 | 97 | 93 | |
| 200 hr after | | 63 | 54 | 62 | |
| 400 hr after | | 48 | 36 | 55 | |

| | Example | | | | | Comparative Example | | | | |
|---|---|---|---|---|---|---|---|---|---|---|
| Example | 4 | 5 | 6 | 7 | 8 | 3 | 4 | 5 | 6 | 7 | 8 |
| Resin composition No. | 4-6 | 4-7 | 4-8 | 4-9 | 4-10 | 4-11 | 4-12 | 4-13 | 4-14 | 4-15 | General purpose ABS resin 100 parts |
| Blend (part) | | | | | | | | | | | |
| Graft copolymer No. | | | | | | | | | | | |
| 2-8 | 35 | | | | | | | | | | |
| 2-9 | | 35 | | | | | | | | | |
| 2-10 | | | 35 | | | | | | | | |
| 2-11 | | | | 35 | | | | | | | |
| 2-12 | | | | | 35 | | | | | | |
| 2-14 | | | | | | 81.7 | | | | | |
| 2-15 | | | | | | | 27.2 | | | | |
| 2-16 | | | | | | | | 35 | | | |
| 2-3 | | | | | | | | | 35 | 35 | |
| Hard copolymer No. | | | | | | | | | | | |
| 3-1 | | | | | 65 | 18.3 | 72.8 | 65 | | | |
| 3-2 | 65 | | | | | | | | | | |
| 3-3 | | 65 | | 65 | | | | | | | |
| 3-4 | | | 65 | | | | | | | | |
| 3-5 | | | | | | | | | 65 | | |
| 3-6 | | | | | | | | | | 65 | |
| Property | | | | | | | | | | | |
| Izod impact value (kg · cm/cm) | 48.8 | 37.6 | 38.0 | 45.3 | 46.6 | 6.2 | 8.3 | 41.3 | 48.6 | 7.7 | |
| Heat Distortion Temperature (°C.) | 114.6 | 121.5 | 122.8 | 120.2 | 116.4 | 103.5 | 116.0 | 110.4 | 98.0 | 125.3 | |
| Tensile strength (kg/cm²) | 382 | 448 | 454 | 395 | 412 | 374 | 385 | 389 | 394 | 463 | |
| Drop-weight impact value (kg · cm) | | | | | | | | | | | |
| Max. | 303 | 262 | 275 | 318 | 309 | 113 | 102 | 205 | 188 | 111 | |
| Break | 396 | 355 | 358 | 422 | 403 | 217 | 220 | 294 | 243 | 226 | |
| Weather-proofness (kg · cm/cm) | | | | | | | | | | | |
| 0 hr after | 104 | 92 | 95 | 97 | 96 | | | | | | 140 |
| 200 hr after | 66 | 57 | 50 | 57 | 61 | | | | | | 14 |
| 400 hr after | 43 | 48 | 45 | 50 | 43 | | | | | | 5 |

What is claimed is:

1. A thermoplastic resin composition comprising 10 to 60 parts by weight of a maleimide series graft copolymer described in (A) below and 90 to 40 parts by weight of a hard copolymer described in (B) below:

(A): a maleimide series graft copolymer obtained by emulsion graft polymerization of 60 to 20 parts by weight of a monomer mixture comprising 5 to 30% by weight of a maleimide series monomer, 25 to 80% by weight of an aromatic vinyl series monomer, 5 to 40% by weight of a vinyl cyanide series monomer and 0 to 50% by weight of methacrylate or methylmethacrylate monomer, with 40 to 80 parts by weight, as a solid content, of a crosslinked latex containing an ethylene-propylene-non-conjugated diene copolymer containing 0.1 to 20 parts by weight of an acid modified alpha-olefin copolymer relative to 100 parts by weight of an ethylene-propylene-non-conjugated diene copolymer, said acid modified alpha-olefin copolymer being polyethylene modified with carboxylic acid containing 99.8 to 80% by weight of alpha-olefin and 0.2 to 20% by weight of a polymerizable unsaturated carboxylic acid series compound with viscometric average molecular weight of 1,000–4,000, said polymerizable unsaturated carboxylic acid series compound being selected from the group consisting of acrylic acid, maleic acid, itaconic acid, maleic acid anhydride, itaconic acid anhydride and maleic acid monoamide, and (B) a hard copolymer comprising 5 to 30% by weight of a maleimide series monomer, 25 to 80% by weight of an aromatic vinyl series monomer, 5 to 40% by weight of a vinyl cyanide series monomer and 0 to 50% by weight of methacrylate or methylmethacrylate monomer.

2. A composition as defined in claim 1, wherein the weight ratio of ethylene and propylene contained in the ethylene-propylene-non-conjugated diene copolymer is from 85:15 to 30:70.

3. A composition as defined in claim 2, wherein the non-conjugated diene ingredient in the ethylene-propylene-non-conjugated diene copolymer is 1,4-hexadiene, 5-ethylidene-2-norbornene, 5-vinylnorbornene or dicyclopentadiene.

4. A composition as defined in claim 1, wherein the α-olefin is ethylene.

5. A composition as defined in claim 1, wherein the maleimide series monomer is maleimide, N-methylmaleimide, N-ethylmaleimide, N-butylmaleimide, N-laurylmaleimide, N-phenylmaleimide or N-(p-bromophenyl)maleimide.

6. A composition as defined in claim 1, wherein the aromatic vinyl series monomer is styrene, α-methylstyrene or p-methylstyrene.

7. A composition as defined in claim 1, wherein the vinyl cyanide series monomer is acrylonitrile or methacrylonitrile.

8. A composition as defined in claim 1, wherein izod impact value is between 37.6 and 48.8 kg.cm/cm, drop-weight impact value at maximum is between 254 and 318 kg.cm, and drop-weight impact value at break is between 342 and 422 kg.cm.

9. A process for producing a graft copolymer by emulsion polymerization of 60 to 20 parts by weight of a monomer mixture comprising 5 to 30% by weight of a maleimide series monomer, 25 to 80% by weight of an aromatic vinyl series monomer, 5 to 40% by weight of a vinyl cyanide series monomer and 0 to 50% by weight of methacrylate or methylmethacrylate monomer, with 40 to 80 parts by weight, as a solid content, of a crosslinked latex containing an ethylene-proylene-non-conjugated diene copolymer containing 0.1 to 20 parts by weight of an acid modified alpha-olefin copolymer relative to 100 parts by weight of an ethylene-propylene-non-conjugated diene copolymer by using at least one emulsifier, said acid modified alpha-olefin copolymer being polyethylene modified with carboxylic acid containing 99.8 to 80% by weight of alpha-olefin and 0.2 to 20% by weight of a polymerizable unsaturated carboxylic acid series compound with viscometric average molecular weight of 1,000–4,000, said polymerizable unsaturated carboxylic acid series compound being selected from the group consisting of acrylic acid, maleic acid, itaconic acid, maleic acid anhydride, itaconic acid anhydride and malice acid monoamide, wherein said monomer mixture and a redox type initiator are continuously added to the crosslinked latex for more than one hour and an aqueous solution of an alkali is added continuously so as to maintain pH value of the mixture to 10.0–7.0 from start to completion of the polymerization.

10. A process as defined in claim 9, wherein a mixture of an ethylene-propylene-non-conjugated diene copolymer and a modified low molecular weight α-olefin are emulsified and the resultant latex is subjected to crosslinking reaction to form a crosslinked latex containing an ethylene-propylene-non-conjugated diene copolymer.

11. A process as defined in claim 9, wherein the gel content of the crosslinked latex containing the ethylene-propylene-non-conjugated diene copolymer is 40 to 95% by weight.

12. A process as defined in claim 9, wherein the emulsifier is selected from the group consisting of potassium oleate, disproportionated potassium rosinate, alkali metal alkylbenzene sulfonate, alkali metal alkylnaphthalene sulfonate and alkali metal lauryl sulfate.

13. A process as defined in claim 9, wherein the pH value of the aqueous polymerization phase is kept at 9.0–8.0 from 10 min after the start of the polymerization to the completion of the polymerization.

14. A process as defined in claim 9, wherein the redox type initiator is an oil-soluble organic peroxide and used in combination with ferrous sulfate-chelating agent-reducing agent, said chelating agent being selected from the group consisting sodium pyrophosphate add sodium ethylenediamine tetraacetate.

15. A method as defined in claim 9, wherein the graft copolymer has izod impact value between 37.6 and 48.8 kg.cm/cm, drop-weight impact value at maximum between 254 and 318 kg.cm, and drop-weight impact value at break between 342 and 422 kg.cm.

* * * * *